United States Patent
Morishita et al.

(10) Patent No.: US 9,541,997 B2
(45) Date of Patent: Jan. 10, 2017

(54) THREE-DIMENSIONAL USER INTERFACE APPARATUS AND THREE-DIMENSIONAL OPERATION METHOD

(71) Applicant: NEC Solution Innovators, Ltd., Koto-ku, Tokyo (JP)

(72) Inventors: Koji Morishita, Tokyo (JP); Katsuyuki Nagai, Tokyo (JP); Hisashi Noda, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 42 days.

(21) Appl. No.: 14/416,846

(22) PCT Filed: Mar. 28, 2013

(86) PCT No.: PCT/JP2013/002131
§ 371 (c)(1),
(2) Date: Jan. 23, 2015

(87) PCT Pub. No.: WO2014/016992
PCT Pub. Date: Jan. 30, 2014

(65) Prior Publication Data
US 2015/0277555 A1    Oct. 1, 2015

(30) Foreign Application Priority Data

Jul. 27, 2012 (JP) ................................. 2012-167040

(51) Int. Cl.
*G06F 3/01* (2006.01)
*G06T 19/20* (2011.01)
(Continued)

(52) U.S. Cl.
CPC ............. *G06F 3/013* (2013.01); *G02B 27/017* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS 6,434,255 B1 * 8/2002 Harakawa ............... G06F 3/011
348/169
2002/0037768 A1    3/2002 Ohshima
(Continued)

FOREIGN PATENT DOCUMENTS

EP    0913790 A1    5/1999
JP    H05-282425 A    10/1993
(Continued)

OTHER PUBLICATIONS

Keytreeuk: "Smart Vision-SAP HANA+Augmented Reality+Microsoft Kinect", Mar. 30, 2012, p. 1-1, XP054976360, Retrieved from the Internet: URL: https://www.youtube.com/watch?v=CsNuwHITwuU Cited in EESR.
(Continued)

*Primary Examiner* — Kenneth B Lee, Jr.

(57) ABSTRACT

A three-dimensional user interface apparatus includes a calculation unit that calculates three-dimensional position information on a three-dimensional coordinate space regarding a specific part of a target person by using three-dimensional information acquired from a three-dimensional sensor, a generation unit that generates virtual three-dimensional object data indicating a virtual three-dimensional object disposed in the three-dimensional coordinate space, a state acquisition unit that acquires state information of the specific part of the target person, an operation specifying unit that specifies a predetermined process to be performed from among a plurality of predetermined processes on the basis of a combination of the state information and a change in the three-dimensional position information, a processing unit that performs the predetermined process specified by
(Continued)

the operation specifying unit on the virtual three-dimensional object data, and a display processing unit that displays a virtual three-dimensional object corresponding to the virtual three-dimensional object data on which the predetermined process has been performed, on a display unit.

14 Claims, 12 Drawing Sheets

(51) Int. Cl.
    *G06T 19/00*     (2011.01)
    *G02B 27/01*     (2006.01)

(52) U.S. Cl.
    CPC .............. *G06T 19/006* (2013.01); *G06T 19/20* (2013.01); *G06T 2219/2016* (2013.01)

(56) References Cited

U.S. PATENT DOCUMENTS

| | | | |
|---|---|---|---|
| 2004/0254699 | A1 | 12/2004 | Inomae et al. |
| 2008/0231926 | A1* | 9/2008 | Klug .................. H04N 13/0425 359/23 |

FOREIGN PATENT DOCUMENTS

| | | | |
|---|---|---|---|
| JP | H06-131442 | A | 5/1994 |
| JP | H06-337907 | A | 12/1994 |
| JP | 2000-098300 | A | 4/2000 |
| JP | 2002-112286 | A | 4/2002 |
| JP | 4271236 | B2 | 12/2006 |
| JP | 2011-514232 | A | 5/2011 |
| JP | 2011-515736 | A | 5/2011 |
| WO | 2008/115997 | A2 | 9/2008 |

OTHER PUBLICATIONS

Kooima et al: "Kinect+ 3D TV= Virtual Reality", YouTube, Feb. 26, 2011, p. 1-1, XP054976361, Retrieved from the Internet: URL:https//www.youtube.com/watch?v=2MXIRinEXUM Cited in EESR.

Hackenberg et al.:"3D Multi-touch Prototype for Augmented and Virtual Reality", YouTube, Jun. 26, 2010, p. 1-1, KP054976362, Retrieved from the Internet: URL:https://www.youtube.com/watch?v=Tw1mXjMshJE Cited in EESR.

Keytreeuk: "Smart Vision—Interactive Augmented Reality, Hand Tracking using Kinects SAP HANA, NetWeaver Cloud", YouTube, Nov. 25, 2012, p. 1-1, XP054976363, Retrieved from the Internet: URL:https://www.youtube.com/watch?v=8FggsGUK5iA Cited in EESR.

Extended European Search Report for EP Application No. EP13822249.2 dated Feb. 17, 2016.

International Search Report for PCT Application No. PCT/JP2013/002131, mailed on May 7, 2013.

* cited by examiner

THREE-DIMENSIONAL USER INTERFACE APPARATUS AND THREE-DIMENSIONAL OPERATION METHOD

This application is a National Stage Entry of PCT/JP2013/002131 filed on Mar. 28, 2013, which claims priority from Japanese Patent Application 2012-167040 filed on Jul. 27, 2012, the contents of all of which are incorporated herein by reference, in their entirety.

TECHNICAL FIELD

The present invention relates to a three-dimensional user interface technique.

BACKGROUND ART

In recent years, a technique of realizing a three-dimensional environment on a computer, such as three-dimensional computer graphics (3DCG) or augmented reality (AR), has been actively put into practical use. In the AR technique, a virtual object or data is displayed so as to be superimposed on an object in the real world which is obtained through a camera of a portable apparatus such as a smart phone or a head mounted display (HMD). A user can visually recognize a three-dimensional image by using such a display technique. The following Patent Document 1 proposes a technique in which a user is identified and tracked within a scene by using a depth sensing camera, and avatar animation for simulating a movement of the user is displayed within the scene according to a result thereof.

However, a user interface (UI) for operating a three-dimensional environment represented by the above-described technique has been realized by using a two-dimensional input device. For example, a two-dimensional mouse operation is converted into an operation of a three-dimensional space. Thus, there are many cases where it is not easy to intuitively understand a current UI for operating a three-dimensional environment.

Therefore, the following Patent Document 2 proposes a technique in which a remote controller having a depth camera is used to detect a positional change of the remote controller, and an input command which causes an action by an application is triggered on the basis of the change. In addition, the following Patent Document 3 proposes a technique which provides a computer interaction experience to a user in a natural three-dimensional environment without the need for additional equipment such as an arm cover or a glove. In this proposal, a depth camera is installed at a position opposing a user, an image into which a virtual object is inserted is displayed along with the user captured by the depth camera, and interaction between the user and the virtual object is detected.

RELATED DOCUMENT

Patent Document

[Patent Document 1] PCT Japanese Translation Patent Publication No. 2011-515736
[Patent Document 2] PCT Japanese Translation Patent Publication No. 2011-514232
[Patent Document 3] Japanese Patent No. 4271236

SUMMARY OF THE INVENTION

Problem to be Solved by the Invention

According to the method proposed in the above-described Patent Document 3, the virtual object disposed in real space which is generated as an image can be moved by the user's hand present in the image. However, Patent Document 3 does not propose a specific operation method for the virtual object, or any operation method other than the movement.

The present invention has been made in consideration of the above-described circumstances and provides a user interface technique which enables intuitive operations of a virtual three-dimensional object which is displayed in a stereoscopic manner.

In each aspect of the present invention, the following configurations are employed in order to solve the above-described problems.

A three-dimensional user interface apparatus according to a first aspect includes a three-dimensional information acquisition unit that acquires three-dimensional information from a three-dimensional sensor; a position calculation unit that calculates three-dimensional position information on a three-dimensional coordinate space regarding a specific part of a target person by using the three-dimensional information acquired by the three-dimensional information acquisition unit; a virtual data generation unit that generates virtual three-dimensional object data indicating a virtual three-dimensional object disposed in the three-dimensional coordinate space; a state acquisition unit that acquires state information of the specific part of the target person; an operation specifying unit that specifies a predetermined process to be performed from among a plurality of predetermined processes on the basis of a combination of the state information acquired by the state acquisition unit and a change in the three-dimensional position information; an object processing unit that performs the predetermined process specified by the operation specifying unit on the virtual three-dimensional object data; and a display processing unit that displays a virtual three-dimensional object corresponding to the virtual three-dimensional object data on which the predetermined process has been performed, on a display unit.

A three-dimensional operation method according to a second aspect of the present invention is executed by at least one computer. The three-dimensional operation method according to the second aspect includes acquiring three-dimensional information from a three-dimensional sensor; calculating three-dimensional position information on a three-dimensional coordinate space regarding a specific part of a target person by using the acquired three-dimensional information; generating virtual three-dimensional object data indicating a virtual three-dimensional object disposed in the three-dimensional coordinate space; acquiring state information of the specific part of the target person; specifying a predetermined process to be performed from among a plurality of predetermined processes on the basis of a combination of the acquired state information and a change in the three-dimensional position information; performing the specified predetermined process on the virtual three-dimensional object data; and displaying a virtual three-dimensional object corresponding to the virtual three-dimensional object data on which the predetermined process has been performed, on a display unit.

In addition, according to other aspects of the present invention, there may be provided a program causing a computer to realize each configuration included in the first aspect, and there may be provided a computer readable recording medium recording the program thereon. The recording medium includes a non-transitory tangible medium.

It is possible to provide a user interface technique which allows a virtual three-dimensional object which is displayed in a stereoscopic manner to be intuitively easily understood.

BRIEF DESCRIPTION OF THE DRAWINGS

The above-described object, and other objects, features and advantages will be further apparent through preferred exemplary embodiments described below and accompanying drawings.

DESCRIPTION OF EXEMPLARY EMBODIMENTS

Figure 1:
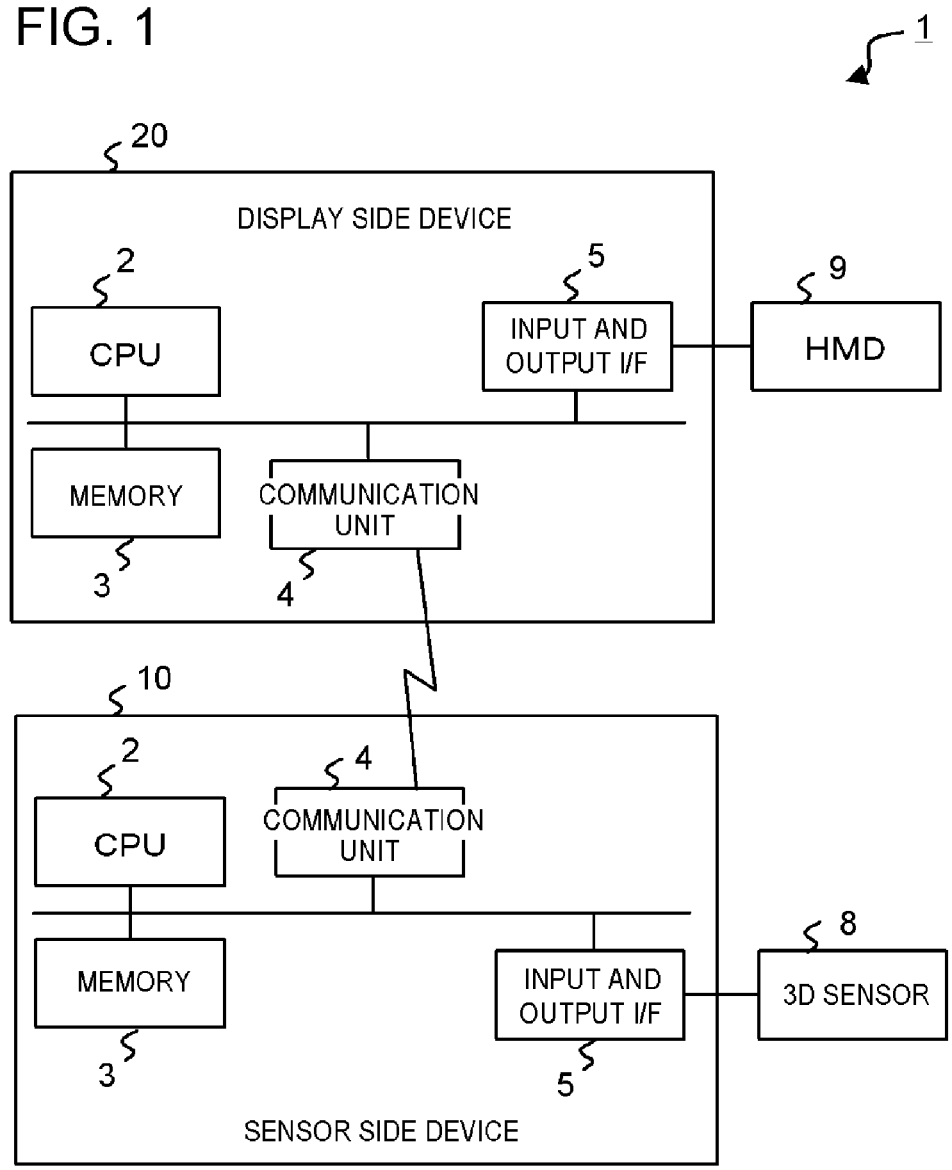
FIG. 1 is a diagram conceptually illustrating a hardware configuration example of a three-dimensional user interface apparatus (3D-UI apparatus) in a first exemplary embodiment.

Hereinafter, exemplary embodiments of the present invention will be described. In addition, the following respective exemplary embodiments are only an example, and the present invention is not limited to configurations of the following respective exemplary embodiments.

A three-dimensional user interface apparatus in the present exemplary embodiment includes a three-dimensional information acquisition unit that acquires three-dimensional information from a three-dimensional sensor; a position calculation unit that calculates three-dimensional position information on a three-dimensional coordinate space regarding a specific part of a target person by using the three-dimensional information acquired by the three-dimensional information acquisition unit; a virtual data generation unit that generates virtual three-dimensional object data indicating a virtual three-dimensional object disposed in the three-dimensional coordinate space; a state acquisition unit that acquires state information of the specific part of the target person; an operation specifying unit that specifies a predetermined process to be performed from among a plurality of predetermined processes on the basis of a combination of the state information acquired by the state acquisition unit and a change in the three-dimensional position information; an object processing unit that performs the predetermined process specified by the operation specifying unit on the virtual three-dimensional object data; and a display processing unit that displays a virtual three-dimensional object corresponding to the virtual three-dimensional object data on which the predetermined process has been performed, on a display unit.

A three-dimensional operation method executed by at least one computer in the present exemplary embodiment includes acquiring three-dimensional information from a three-dimensional sensor; calculating three-dimensional position information on a three-dimensional coordinate space regarding a specific part of a target person by using the acquired three-dimensional information; generating virtual three-dimensional object data indicating a virtual three-dimensional object disposed in the three-dimensional coordinate space; acquiring state information of the specific part of the target person; specifying a predetermined process to be performed from among a plurality of predetermined processes on the basis of a combination of the acquired state information and a change in the three-dimensional position information; performing the specified predetermined process on the virtual three-dimensional object data; and displaying a virtual three-dimensional object corresponding to the virtual three-dimensional object data on which the predetermined process has been performed, on a display unit.

In the present exemplary embodiment, three-dimensional information is acquired from the three-dimensional sensor. The three-dimensional information includes a two-dimensional image of the target person obtained on the basis of visible light, and information on a distance (depth) from the three-dimensional sensor. The three-dimensional sensor may be configured by a plurality of devices including a visible light camera and a depth sensor.

In the present exemplary embodiment, three-dimensional position information on a three-dimensional coordinate space regarding a specific part of the target person is calculated by using the three-dimensional information, and the data of the virtual three-dimensional object disposed in the three-dimensional coordinate space is generated. Here, the specific part is a part of the body used in order for the target person to operate a virtual three-dimensional object displayed on the display unit. In the present exemplary embodiment, the specific part is not limited.

The calculation of the three-dimensional position information includes not only directly obtaining three-dimensional position information from three-dimensional information which is detected by the three-dimensional sensor, but also indirectly obtaining three-dimensional position information from the three-dimensional information which is detected by the three-dimensional sensor. The term "indirectly" indicates that three-dimensional position information is obtained from information which is obtained by performing a predetermined process on three-dimensional information detected by the three-dimensional sensor. Therefore, the 3D coordinate space may be determined, for example, on the basis of a camera coordinate system of a three-dimensional sensor, and may be determined on the basis of a marker coordinate system calculated from an image marker or the like having a known shape which is detected from three-dimensional information.

Further, in the present exemplary embodiment, state information of a specific part of the target person is acquired. This specific part is the same as a specific part which is a calculation target of three-dimensional position information. This state information indicates one of at least two states. Specifically, in a case where the specific part is the hand, the state information indicates one of at least two states including a closed state and an open state. In the present exemplary embodiment, the number of states indicated by the state information is not limited within a detectable range.

In the present exemplary embodiment, as mentioned above, three-dimensional position information regarding the specific part of the target person is sequentially calculated by using the three-dimensional information which is sequentially acquired from the three-dimensional sensor, and the state information of the specific part is acquired, so that a state and a change in the three-dimensional position information regarding the specific part of the target person, that is, a three-dimensional operation (three-dimensional gesture) of the specific part of the target person is detected. The detected three-dimensional gesture is formed by a movement and a state of the specific part.

In the present exemplary embodiment, a predetermined process is specified on the basis of a combination of the state information and a change in the three-dimensional position information, indicating the three-dimensional gesture, and the predetermined process is applied to virtual three-dimensional object data. In addition, a virtual three-dimensional object corresponding to a result to which the predetermined process is applied is displayed on the display unit. Here, the predetermined process is a process of, for example, moving, rotating, enlarging, or reducing the virtual three-dimensional object.

Therefore, according to the present exemplary embodiment, the target person (user) makes a predetermined three-dimensional gesture by using a specific part of the person him/herself, and can thus operate a virtual three-dimensional object displayed on the display unit as desired. Further, in the present exemplary embodiment, since an operation on a virtual three-dimensional object can be performed through a three-dimensional gesture of a specific part of the user, the user can have a feeling of operating a virtual three-dimensional object, intuitively and comprehensively. Still further, in the present exemplary embodiment, since an operation on a virtual three-dimensional object is specified in consideration of not only a change in a position of the specific part but also a state of the specific part, according to the present exemplary embodiment, the user can operate the virtual three-dimensional object with the same operation feeling as an operation on an object in the real world.

Hereinafter, the above-described exemplary embodiment will be described more in detail.

First Exemplary Embodiment

Device Configuration

FIG. 1 is a diagram conceptually illustrating a hardware configuration example of a three-dimensional user interface apparatus (hereinafter, referred to as a 3D-UI apparatus) 1 in a first exemplary embodiment. The 3D-UI apparatus 1 in the first exemplary embodiment roughly has a sensor side configuration and a display side configuration. The sensor side configuration includes a three-dimensional sensor (hereinafter, referred to as a 3D sensor) 8 and a sensor side device 10. The display side configuration includes a head mounted display (hereinafter, referred to as an HMD) 9 and a display side device 20. Hereinafter, three-dimensional is abbreviated to 3D as appropriate.

Figure 2:
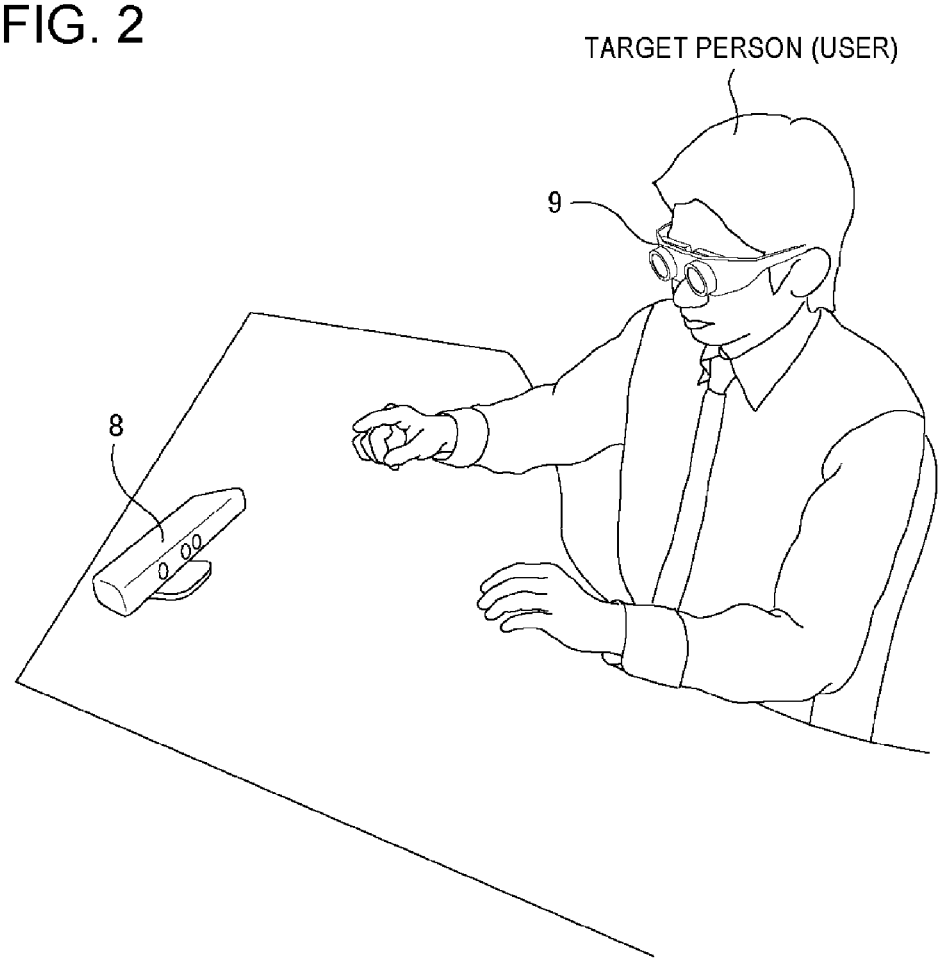
FIG. 2 is a diagram illustrating an example of a form of using the three-dimensional user interface apparatus (3D-UI apparatus) in the first exemplary embodiment.

FIG. 2 is a diagram illustrating an example of a form of using the 3D-UI apparatus 1 in the first exemplary embodiment. As illustrated in FIG. 2, the 3D sensor 8 is disposed at a position where a specific part of a target person (user) can be detected. The HMD 9 is mounted on the head of the target person (user), and allows the target person to visually recognize a visual line image corresponding to a visual line of the target person and the above-described virtual 3D object which is synthesized with the visual line image.

The 3D sensor 8 detects 3D information used to perform detection or the like of the specific part of the target person. The 3D sensor 8, such as Kinect (registered trademark), is implemented by using a visible light camera and a distance image sensor. The distance image sensor is also referred to as a depth sensor, irradiates the target person with a near infrared light pattern from a laser, and calculates a distance (depth) from the distance image sensor to the target person on the basis of information which is obtained by imaging the pattern with a camera which senses the near infrared light. A method of implementing the 3D sensor 8 is not limited, and the 3D sensor 8 may be implemented in a three-dimensional scanner method of using a plurality of visible light cameras. Further, FIG. 1 illustrates a single 3D sensor 8, but the 3D sensor 8 may be implemented by using a plurality of devices including a visible light camera which captures a two-dimensional image of the target person and a sensor which detects a distance to the target person.

Figure 3:
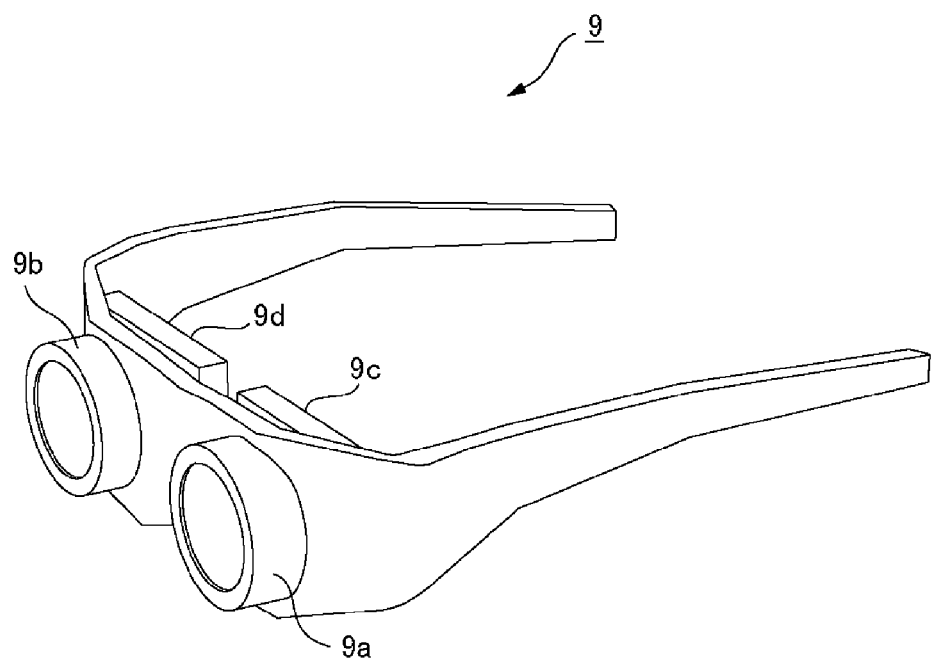
FIG. 3 is a diagram illustrating an example of an exterior configuration of an HMD.

FIG. 3 is a diagram illustrating an example of an exterior configuration of the HMD 9. FIG. 3 illustrates a configuration of the HMD 9 which is called a video see-through type. In the example of FIG. 3, the HMD 9 includes two visual line cameras 9a and 9b and two displays 9c and 9d. The visual line cameras 9a and 9b respectively capture visual line images which respectively correspond to visual lines of the user. Consequently, the HMD 9 may be referred to as an imaging unit. The displays 9c and 9d are disposed in a form of covering most of visual fields of the user, and display synthesized 3D images in which the virtual 3D object is synthesized with the visual line images.

Each of the sensor side device 10 and the display side device 20 includes a central processing unit (CPU) 2, a memory 3, a communication unit 4, an input and output interface (I/F) 5, and the like, connected to each other through a bus or the like. The memory 3 is a random access memory (RAM), a read only memory (ROM), a hard disk, a portable storage medium, or the like.

The input and output I/F 5 of the sensor side device 10 is connected to the 3D sensor 8, and the input and output I/F 5 of the display side device 20 is connected to the HMD 9. The input and output I/F 5 and the 3D sensor 8, and the input and output I/F 5 and the HMD 9 may be connected to each other so as to communicate with each other in a wireless manner. Each communication unit 4 performs communication with other devices (the sensor side device 10, the display side device 20, and the like) in a wireless or wired manner. In the present exemplary embodiment, a communication form is not limited. In addition, specific hardware configurations of the sensor side device 10 and the display side device 20 are not limited either.

[Process Configuration]
<Sensor Side Device>

Figure 4:
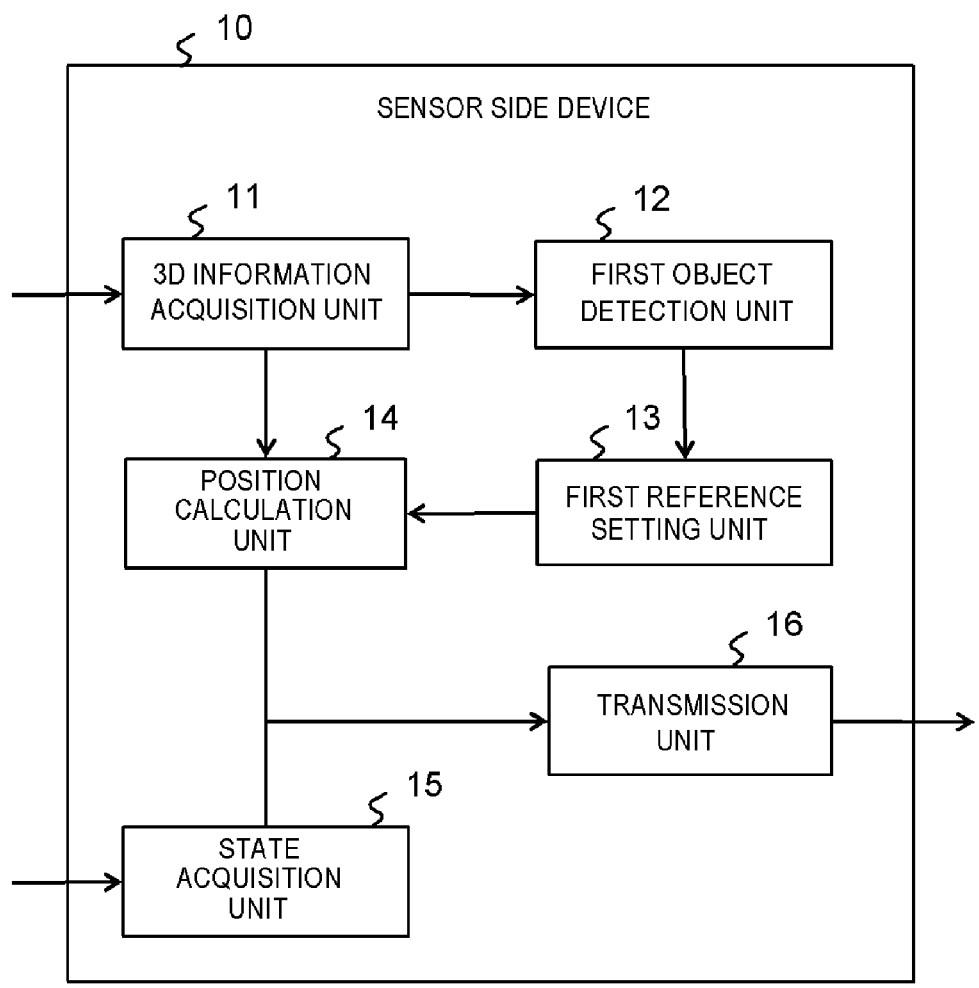
FIG. 4 is a diagram conceptually illustrating a process configuration example of a sensor side device in the first exemplary embodiment.

FIG. 4 is a diagram conceptually illustrating a process configuration example of the sensor side device 10 in the first exemplary embodiment. The sensor side device 10 in the first exemplary embodiment includes a 3D information acquisition unit 11, a first object detection unit 12, a first reference setting unit 13, a position calculation unit 14, a state acquisition unit 15, a transmission unit 16, and the like. Each of the processing units is realized, for example, by the CPU 2 executing a program stored in the memory 3. In addition, the program may be installed and stored in the memory 3, for example, through the input and output I/F 5 from a portable recording medium such as a compact disc (CD) or a memory card, or other computers on a network.

The 3D information acquisition unit 11 sequentially acquires 3D information detected by the 3D sensor 8.

The first object detection unit 12 detects a known common real object from the 3D information which is acquired by the 3D information acquisition unit 11. The common real object is an image or an object disposed in the real world, and is referred to as an augmented reality (AR) marker or the like. In the present exemplary embodiment, a specific form of the common real object is not limited as long as a certain reference point, and three directions which are perpendicular to each other from the reference point can be constantly obtained from the common real object regardless of a reference direction. The first object detection unit 12 holds information on a shape, a size, a color, and the like indicated by the common real object in advance, and detects the common real object from the 3D information by using the known information.

The first reference setting unit 13 sets a 3D coordinate space on the basis of the common real object detected by the first object detection unit 12, and calculates a position and a direction of the 3D sensor 8 in the 3D coordinate space. For example, the first reference setting unit 13 uses a reference point extracted from the common real object as an origin, and sets a 3D coordinate space which has three directions perpendicular to each other from the reference point as axes. The first reference setting unit 13 compares a known shape and size (corresponding to original shape and size) regarding the common real object with a shape and a size (corresponding to an appearance from the 3D sensor 8) of the common real object extracted from the 3D information to calculate a position and a direction of the 3D sensor 8.

The position calculation unit 14 sequentially calculates 3D position information on the 3D coordinate space regarding the specific part of the target person by using the 3D information which is sequentially acquired by the 3D information acquisition unit 11. In the first exemplary embodiment, the position calculation unit 14 calculates the 3D position information, specifically, as follows. First, the position calculation unit 14 extracts 3D position information of the specific part of the target person from the 3D information which is acquired by the 3D information acquisition unit 11. The 3D position information extracted here corresponds to a camera coordinate system of the 3D sensor 8. Thus, the position calculation unit 14 converts the 3D position information corresponding to the camera coordinate system of the 3D sensor 8 into 3D position information on the 3D coordinate space set by the first reference setting unit 13, on the basis of the position and the direction of the 3D sensor 8 and the 3D coordinate space set-and-calculated by the first reference setting unit 13. This conversion indicates conversion from the camera coordinate system of the 3D sensor 8 into a 3D coordinate system which is set on the basis of the common real object.

Here, a plurality of specific parts of the target person may be detected. For example, as the plurality of specific parts, there may be a form of using both hands of the target person. In this case, the position calculation unit 14 extracts 3D position information of each of a plurality of specific parts from 3D information acquired by the 3D information acquisition unit 11, and converts each piece of the 3D position information into each piece of 3D position information on a 3D coordinate space. The specific part is apart of the body used in order for the target person to operate a virtual 3D object displayed on the display unit and thus has an area or a volume to a certain degree. Therefore, the 3D position information calculated by the position calculation unit 14 may be position information of a certain point within the specific part, and may be position information of a plurality of points.

The state acquisition unit 15 acquires state information of the specific part of the target person. This specific part is the same as the specific part which is a detection target of the position calculation unit 14. In the present exemplary embodiment, the number of states indicated by the state information is not limited in a detectable range. In a case where a plurality of specific parts are used, the state acquisition unit 15 respectively acquires state information regarding each specific part.

The state acquisition unit 15 holds in advance, for example, image feature information corresponding to each state of the specific part to be identified, and acquires the state information of the specific part by comparing feature information extracted from a 2D image included in the 3D information which is acquired by the 3D information acquisition unit 11 with each piece of the image feature information held in advance. The state acquisition unit 15 may acquire the state information of the specific part from information which is obtained from a distortion sensor (not illustrated) mounted on the specific part. Further, the state acquisition unit 15 may acquire the state information from information which is obtained from an input mouse (not illustrated) operated with the target person's hand. Still further, the state acquisition unit 15 may acquire the state information by recognizing a voice which is obtained by a microphone (not illustrated).

The transmission unit 16 sends the three-dimensional position information on the three-dimensional coordinate space calculated by the position calculation unit 14, regarding the specific part of the target person, and the state information acquired by the state acquisition unit 15, to the display side device 20.

<Display Side Device>

Figure 5:
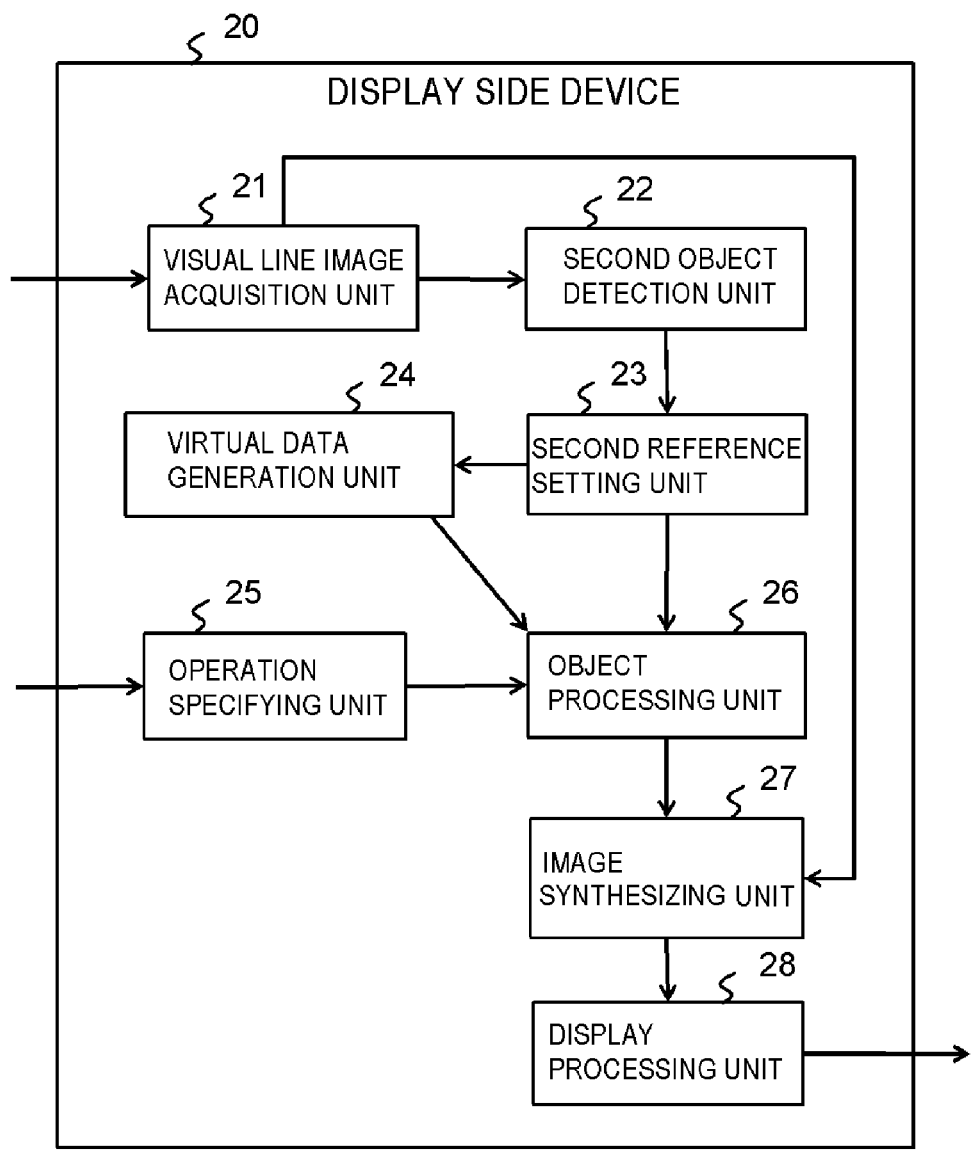
FIG. 5 is a diagram conceptually illustrating a process configuration example of a display side device in the first exemplary embodiment.

FIG. 5 is a diagram conceptually illustrating a process configuration example of the display side device 20 in the first exemplary embodiment. The display side device 20 in the first exemplary embodiment includes a visual line image acquisition unit 21, a second object detection unit 22, a second reference setting unit 23, a virtual data generation unit 24, an operation specifying unit 25, an object processing unit 26, an image synthesizing unit 27, a display processing unit 28, and the like. Each of the processing units is realized, for example, by the CPU 2 executing a program stored in the memory 3. In addition, the program may be installed and stored in the memory 3, for example, through the input and output I/F 5 from a portable recording medium such as a compact disc (CD) or a memory card, or other computers on a network.

The visual line image acquisition unit 21 acquires visual line images in which a specific part of the target person is reflected, from the HMD 9. This specific part is the same as the specific part which is a detection target of the sensor side device 10. In the present exemplary embodiment, since the visual line cameras 9a and 9b are provided, the visual line image acquisition unit 21 acquires visual line images which respectively correspond to the left eye and the right eye. Each of the processing units performs a process on both of the visual line images corresponding to the left eye and the right eye, and thus a single visual line image will be described in the following description.

The second object detection unit 22 detects a known common real object from the visual line images which are acquired by the visual line image acquisition unit 21. This common real object is the same as the object detected by the above-described sensor side device 10. A process in the second object detection unit 22 is the same as the process in the first object detection unit 12 of the above-described sensor side device 10, and thus a detailed description thereof will not be repeated here. The common real object included in the visual line images is different in an imaging direction from the common real object included in the 3D information obtained by the 3D sensor 8.

The second reference setting unit 23 sets the 3D coordinate space which has been set by the first reference setting unit 13 of the sensor side device 10 on the basis of the common real object detected by the second object detection unit 22, and calculates a position and a direction of the HMD 9. A process in the second reference setting unit 23 is also the same as the process in the first reference setting unit 13 of the sensor side device 10, and thus a detailed description will not be repeated. The 3D coordinate space set by the second reference setting unit 23 is set on the basis of the same common real object as in the 3D coordinate space which is set by the first reference setting unit 13 of the sensor side device 10, and, as a result, the 3D coordinate space is shared between the sensor side device 10 and the display side device 20.

The virtual data generation unit 24 generates data of the virtual 3D object disposed in the 3D coordinate space which is shared with the sensor side device 10 by the second reference setting unit 23. The virtual data generation unit 24 may generate data of a virtual 3D space in which the virtual 3D object is disposed, along with the virtual 3D object data.

The operation specifying unit 25 receives the 3D position information on the 3D coordinate space and the state information regarding the specific part of the target person, from the sensor side device 10, and specifies a single predetermined process to be performed by the object processing unit 26 from among a plurality of predetermined processes on the basis of a combination of the state information and a change in the 3D position information. The change in the 3D position information is calculated on the basis of a relationship with the 3D position information which is obtained at the time of the previous process. In a case where a plurality of specific parts (for example, both hands) are used, the operation specifying unit 25 calculates a positional relationship between the plurality of specific parts on the basis of a plurality of pieces of 3D position information acquired from the sensor side device 10, and specifies a single predetermined process from among a plurality of pieces of predetermined processes on the basis of a change in the calculated positional relationship between the plurality of specific parts, and the plurality of pieces of state information. The plurality of predetermined processes include a movement process, a rotation process, an enlargement process, a reduction process, an addition process of display data of a function menu, and the like.

More specifically, the operation specifying unit 25 specifies the following predetermined process. For example, in a case where a specific part of the target person is one hand, the operation specifying unit 25 specifies a movement process by a distance corresponding to a linear movement amount of the one hand of the target person while the one hand is maintained in a specific state (for example, a closed state). In a case where a distance from a specific point of the virtual 3D object is not changed before and after a movement of the one hand while the one hand is maintained in a specific state, the operation specifying unit 25 specifies, as a predetermined process, a rotation process with the specific point as a reference point on the basis of a solid angle change amount of a line segment joining the one hand of the target person and the specific point of the virtual 3D object. The specific point of the virtual 3D object is, for example, a central point. Further, the operation specifying unit 25 measures a period in which state information and three-dimensional position information are not changed, and specifies a process of adding display data of the function menu to the data of the virtual 3D space in which the virtual 3D object is disposed in a case where the measured period exceeds a predetermined period.

In a case where a plurality of specific parts are both hands of the target person, the operation specifying unit 25 specifies the following predetermined process. The operation specifying unit 25 specifies an enlargement process with a position of one hand of the target person as a reference point at a magnification ratio corresponding to a change amount of a distance between both the hands of the target person while both the hands are maintained in a specific state (for example, a closed state). In addition, the operation specifying unit 25 specifies a reduction process with a position of one hand of the target person as a reference point at a reduction ratio corresponding to a change amount of a distance between both the hands of the target person while both the hands are maintained in a specific state (for example, a closed state). Further, the operation specifying unit 25 specifies a rotation process with a position of the one hand of the target person as a reference point on the basis of a solid angle change amount of a line segment joining both hands of the target person while both the hands are maintained in a specific state (for example, a closed state).

Further, the operation specifying unit 25 determines whether or not the specific part is present within a predetermined 3D range which has the virtual 3D object as a reference on the basis of the three-dimensional position information of the specific part of the target person, and determines whether or not the predetermined process is to be performed by the object processing unit 26 according to a determination result thereof. Specifically, if the specific part is present within the predetermined 3D range, the operation specifying unit 25 causes the object processing unit 26 to perform the predetermined process, and if the specific part is present outside the predetermined 3D range, the operation specifying unit 25 causes the object processing unit 26 not to perform the predetermined process. The determination of whether or not the specific part is present within the predetermined 3D range is to simulate a determination of whether or not the specific part of the target person accesses the virtual 3D object. In the present exemplary embodiment, an intuitive operation feeling of the target person is improved by determining whether or not the predetermined process is to be performed by using the predetermined 3D range.

The operation specifying unit 25 may detect a movement of the specific part of the target person from within the predetermined 3D range to the outside of the predetermined 3D range, and may specify, as the predetermined process, a movement process or a rotation process corresponding to a movement distance and a movement direction between a position within the predetermined 3D range and a position outside the predetermined 3D range before and after the movement. Consequently, the target person can move or rotate the virtual 3D object in an inertial manner by an operation up until right before the operation for the virtual 3D object becomes unable. This inertial operation may be switched between being valid and invalid according to settings.

The operation specifying unit 25 holds an ID for identifying each predetermined process as described above, and specifies the predetermined process by selecting the ID corresponding to the predetermined process. The operation specifying unit 25 delivers the selected ID to the object processing unit 26, and thus causes the object processing unit 26 to perform the predetermined process.

The object processing unit 26 applies the predetermined process specified by the operation specifying unit 25 to the virtual 3D object data generated by the virtual data generation unit 24. The object processing unit 26 is realized so as to perform a plurality of supporting predetermined processes.

The image synthesizing unit 27 synthesizes the visual line images acquired by the visual line image acquisition unit 21 with the virtual 3D object corresponding to the virtual 3D object data on which the predetermined process has been performed by the object processing unit 26, on the basis of the position and the direction of the HMD 9 and the 3D coordinate space set-and-calculated by the second reference setting unit 23. A well-known method used in augmented reality (AR) or the like may be employed in the synthesizing process in the image synthesizing unit 27, and thus description thereof will not be repeated here.

The display processing unit 28 displays the synthesized image obtained by the image synthesizing unit 27 on the HMD 9. In the present exemplary embodiment, since two visual line images respectively corresponding to the visual lines of the target person are processed as described above, the display processing unit 28 displays synthesized images in which the virtual 3D object is synthesized with the visual line images on the displays 9c and 9d of the HMD 9, respectively.

Figure 6:
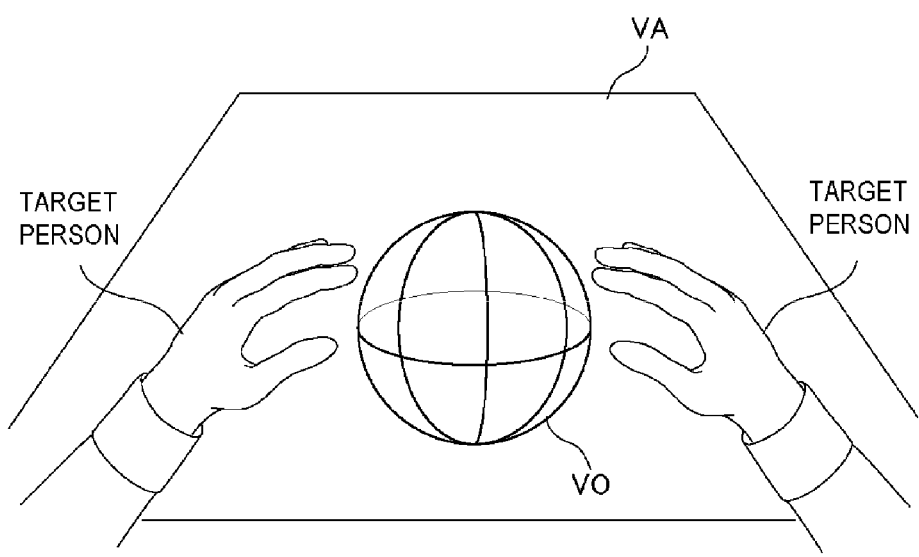
FIG. 6 is a diagram illustrating an example of a synthesized image displayed on the HMD.

FIG. 6 is a diagram illustrating an example of the synthesized image displayed on the HMD 9. The synthesized image illustrated in the example of FIG. 6 includes a spherical virtual 3D object VO disposed on a plane VA which is included in the virtual 3D space. The user moves both of his or her hands while taking a look at the image with the HMD 9, and thus can operate the virtual 3D object VO included in the image. FIG. 6 exemplifies the spherical virtual 3D object VO, but a shape or the like of a virtual 3D object is not limited.

Operation Example

Figure 7:
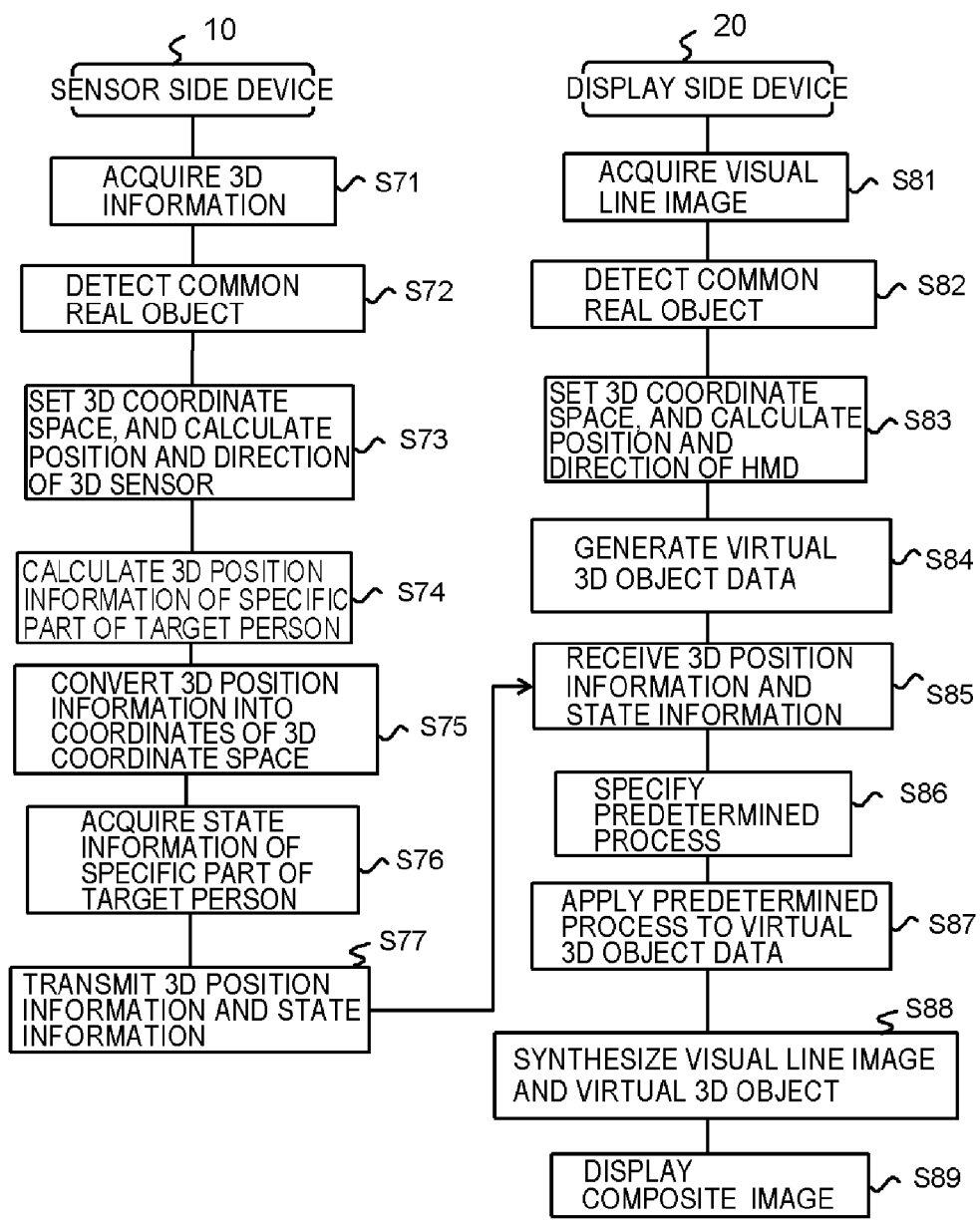
FIG. 7 is a sequence chart illustrating an operation example of the three-dimensional user interface apparatus (3D-UI apparatus) in the first exemplary embodiment.

Hereinafter, a three-dimensional operation method in the first exemplary embodiment will be described with reference to FIG. 7. FIG. 7 is a sequence chart illustrating an operation example of the 3D-UI apparatus 1 in the first exemplary embodiment.

The sensor side device 10 sequentially acquires 3D information from the 3D sensor 8 (step S71). The sensor side device 10 operates as follows in relation to the 3D information with a predetermined frame rate.

The sensor side device 10 detects a common real object from the 3D information (step S72).

Next, the sensor side device 10 sets a 3D coordinate space on the basis of the detected common real object, and calculates a position and a direction of the 3D sensor 8 in the 3D coordinate space (step S73).

Further, the sensor side device 10 calculates the 3D position information of a specific part of the target person by using the 3D information (step S74). Still further, the sensor side device 10 converts the 3D position information calculated in step S74 into 3D position information on the 3D coordinate space which is set in step S73 on the basis of the position and the direction of the 3D sensor 8 and the 3D coordinate space set-and-calculated in step S73 (step S75).

In addition, the sensor side device 10 acquires state information regarding the specific part of the target person (step S76).

The sensor side device 10 sends the 3D position information obtained in step S75 and the state information obtained in step S76, regarding the specific part of the target person, to the display side device 20 (step S77).

In FIG. 7, for convenience of description, an example has been described in which the acquisition of the 3D information (step S71) and the acquisition of the state information (step S76) are sequentially executed, but steps S71 and S76 are executed in parallel in a case where the state information of the specific part is obtained from information other than the 3D information. In FIG. 7, an example has been described in which steps S72 and S73 are executed at a predetermined frame rate of the 3D information, but steps S72 and S73 may be executed only during calibration.

On the other hand, the display side device 20 sequentially acquires a visual line image from the HMD 9 in non-synchronization with the acquisition of the 3D information (step S71) (step S81). The display side device 20 operates as follows in relation to the visual line image with a predetermined frame rate.

The display side device 20 detects the common real object from the visual line image (step S82).

Next, the display side device 20 sets the 3D coordinate space on the basis of the detected common real object, and calculates a position and a direction of the HMD 9 in the 3D coordinate space (step S83).

The display side device 20 generates data of the virtual 3D object disposed in the set 3D coordinate space (step S84).

When the 3D position information and the state information regarding the specific part of the target person are received from the sensor side device 10 (step S85), the display side device 20 specifies a predetermined process corresponding to a gesture of the target person according to a combination of a change in the 3D position information and the state information of the specific part (step S86). In a case where there are a plurality of specific parts, the display side device 20 specifies a predetermined process according to a combination of a change in a positional relationship between the plurality of specific parts and a plurality of pieces of state information.

The display side device 20 applies the predetermined process specified in step S86 to the virtual 3D object data generated in step S84 (step S87). Next, the display side device 20 synthesizes a virtual 3D object corresponding to the virtual 3D object data which has undergone a predetermined process with the visual line image (step S88) so as to generate display data.

The display side device 20 displays the image obtained through the synthesizing on the HMD 9 (step S89).

In FIG. 7, for convenience of description, an example has been described in which the process (from step S85 to step S87) on the information regarding the specific part of the target person, sent from the sensor side device 10, and the generation process (from step S82 to step S84) of the virtual 3D object data are sequentially performed. However, step S85 to step S87 and step S82 to step S84 are executed in parallel to each other. In addition, in FIG. 7, an example has been described in which step S82 to step S84 are executed at a predetermined frame rate of the visual line image, but step S82 to step S84 may be executed only during calibration.

[Operations and Effects of First Exemplary Embodiment]

As described above, in the first exemplary embodiment, visual line images of the target person are acquired, and an image in which a virtual 3D object is synthesized with the visual line images is displayed within a visual field of the target person in a video see-through manner. Consequently, the target person can visually recognize the virtual 3D object as if the virtual 3D object were present in front of the eyes of the target person. In addition, in the first exemplary embodiment, since a specific part (the hand or the like) of the target person for operating a virtual 3D object is reflected in the visual line images, the target person can feel as if the virtual 3D object is operated with the specific part of the person him/herself. In other words, according to the first exemplary embodiment, the target person can intuitively visually recognize a virtual 3D object and can be given an intuitive operation feeling of the virtual 3D object.

In the first exemplary embodiment, the HMD 9 for obtaining a visual line image of the target person and the 3D sensor 8 for obtaining a position of a specific part of the target person are separately provided. Consequently, according to the first exemplary embodiment, the 3D sensor 8 can be disposed at a position where a 3D position of the specific part of the target person can be accurately measured. This is because there may be a 3D sensor 8 present which cannot accurately measure a position of a measurement target unless the 3D sensor is spaced apart from the measurement target to some extent.

In the first exemplary embodiment, a 3D coordinate space shared between the sensors is set on the basis of information obtained by the sensors (the 3D sensor 8 and the HMD 9) which are separately provided, by using a common real object. Further, by using this shared 3D coordinate space, a position of a specific part of the target person is determined, and virtual 3D object data is generated and processed. Still further, in the first exemplary embodiment, by using the shared 3D coordinate space, it is determined whether or not the specific part of the target person is present within a predetermined 3D range with reference to a virtual 3D object, and it is determined whether or not an operation on the virtual 3D object is valid on the basis of the determination result. Therefore, according to the first exemplary embodiment, the target person can intuitively visually recognize a relationship between the virtual 3D object and the specific part of the person him/herself, and, as a result, the target person can be given an intuitive operation feeling of the virtual 3D object as if the target person is directly touching the virtual 3D object.

Still further, in the first exemplary embodiment, a predetermined process applied to the virtual 3D object data is specified based on a combination of a positional change and a state regarding the specific part of the target person, and a virtual 3D object corresponding to the virtual 3D object data which has undergone the predetermined process is synthesized with visual line images. As mentioned above, in the first exemplary embodiment, since an operation on the virtual 3D object is specified in consideration of not only a change in a position of the specific part but also a state of the specific part, according to the present exemplary embodiment, the user can operate the virtual 3D object with the same operation feeling as an operation on an object in the real world. Therefore, according to the first exemplary embodiment, it is possible to provide a user interface which enables intuitive operations of a virtual 3D object.

The above-described exemplary embodiment will be described more in detail by using Examples. The present invention is not limited by the following respective Examples. In the following respective Examples, as the specific part of the target person, "one hand" or "both hands" are used.

Example 1

Figure 8:
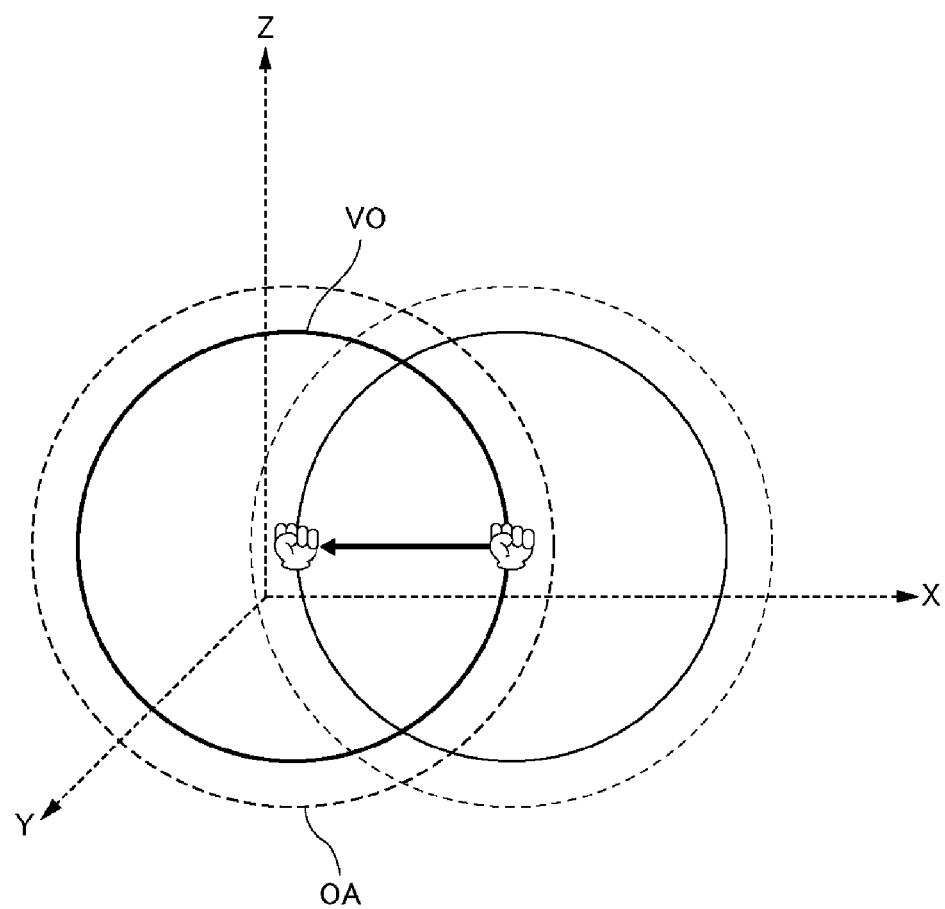
FIG. 8 is a diagram illustrating an example of a movement operation of a virtual 3D object in Example 1.

FIG. 8 is a diagram illustrating an example of a movement operation of a virtual 3D object in Example 1. In FIG. 8, respective axes of a 3D coordinate space are indicated by an X axis, a Y axis, and a Z axis, and a virtual 3D object corresponding to virtual 3D object data generated by the virtual data generation unit 24 is indicated by the reference sign VO. A predetermined 3D range based on the virtual 3D object VO is indicated by the reference sign OA.

In the example of FIG. 8, one hand of the target person is moved in a negative direction of the Y axis in a state in which the one hand is in a closed state within the predetermined 3D range OA. This operation of the one hand can be said to be a gesture of gripping a certain object and moving the object in the direction. If the gesture is recognized within the predetermined 3D range OA, the display side device 20 moves the virtual 3D object VO in the negative direction of the Y axis by a distance corresponding to a linear movement amount of the one hand.

As described above, the target person makes a gesture of gripping an object with one hand and moving the object in a certain direction, and thus can move the virtual 3D object. The gesture and the virtual 3D object operation are the same as an operation on an object in the real world, and are thus naturally intuitively related to each other.

In addition, if it is detected that the one hand of the target person is not moved within the predetermined 3D range OA during a specific period of time in a state in which the one hand is in a closed state, the display side device 20 displays a menu screen for calling other functions along with the virtual 3D object, and enables a user's operation on the menu screen to be performed.

When both hands of the target person are detected to be in a closed state within the predetermined 3D range OA, the display side device 20 makes enlargement, reduction, and rotation operations on the virtual 3D object valid. When it is detected that either of the hands is in an open state, the display side device 20 invalidates enlargement, reduction and rotation operations on the virtual 3D object.

Figure 9:
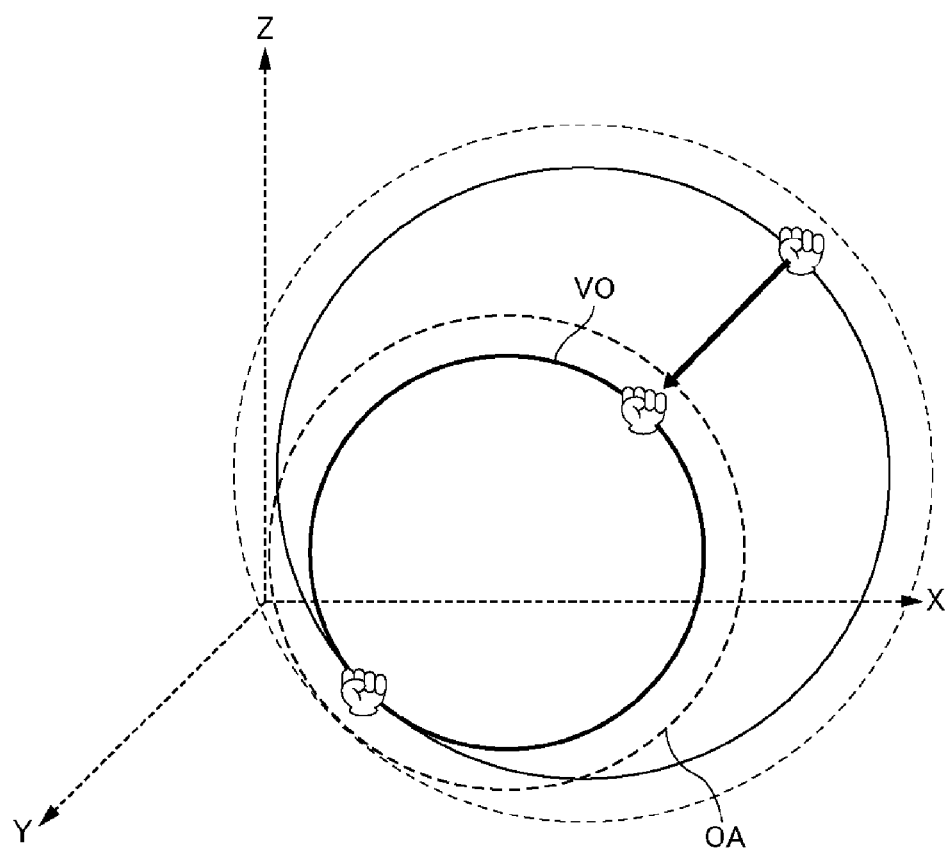
FIG. 9 is a diagram illustrating an example of a reduction operation of the virtual 3D object in Example 1.

FIG. 9 is a diagram illustrating an example of a reduction operation on the virtual 3D object in Example 1. In the same manner as FIG. 8, FIG. 9 illustrates the 3D coordinate space having the X axis, the Y axis, and the Z axis, the virtual 3D object VO, and the predetermined 3D range OA. In the example of FIG. 9, one hand of the target person is diagonally moved toward the lower left direction in the figure, in a state in which both hands are in a closed state within the predetermined 3D range OA. This operation of using the hands can be said to be a gesture of gripping an object with both the hands and reducing the object between both the hands. When this gesture is recognized within the predetermined 3D range OA, the display side device 20 reduces the virtual 3D object VO at a reduction ratio corresponding to a degree of the reduced distance between both the hands. At this time, the display side device 20 sets the hand initially forming a closed state as a reference point of the reduction process at the time at which enlargement, reduction and rotation operations on the virtual 3D object VO become valid.

Although not illustrated in FIG. 9, when it is detected that one hand is moved in a direction in which both hands become distant from each other in a state in which both the hands are in a closed state within the predetermined 3D range OA, the display side device 20 enlarges the virtual 3D object VO at a magnification ratio corresponding to a degree of extension of the distance between both the hands. This operation can be said to be a gesture of gripping an object with both the hands and extending the object with both the hands.

The target person can reduce or enlarge the virtual 3D object by making a gesture of gripping an object with both hands and reducing or extending the object as described above. The gesture and the virtual 3D object operation are also similar to an operation on an object in the real world, and are thus intuitively related to each other.

Figure 10:
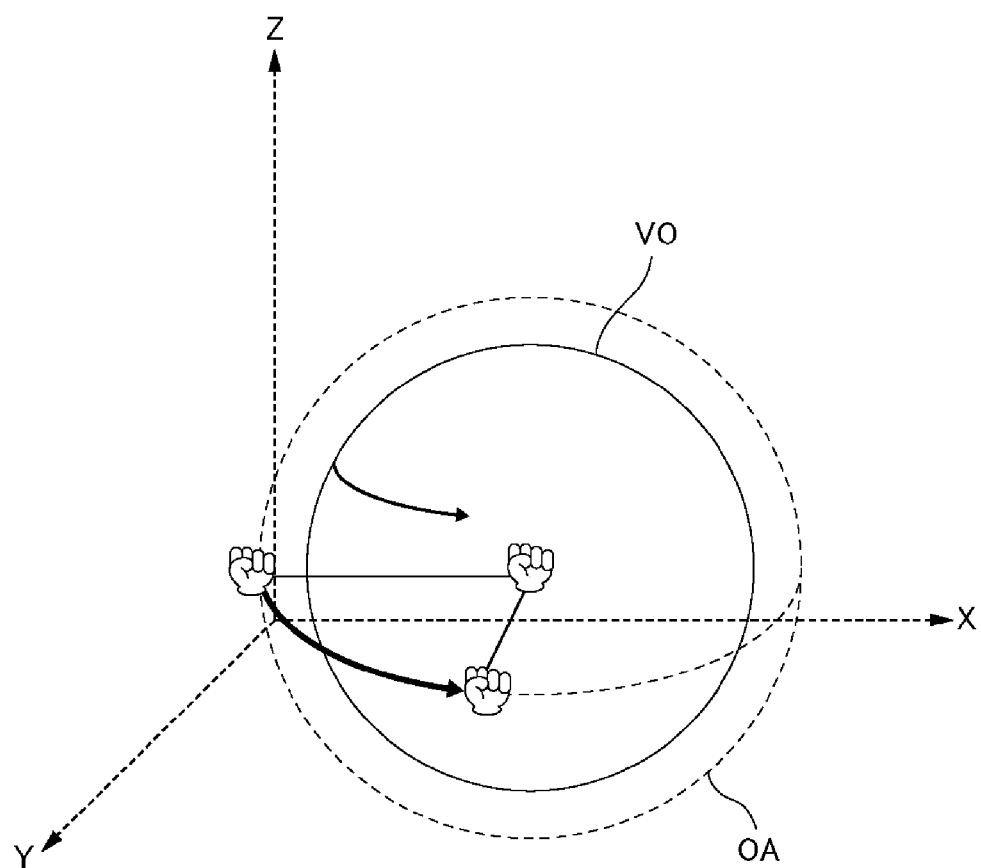
FIG. 10 is a diagram illustrating an example of a rotation operation of the virtual 3D object in Example 1.

FIG. 10 is a diagram illustrating an example of a rotation operation on the virtual 3D object in Example 1. In the same manner as FIG. 8 or 9, FIG. 10 illustrates the 3D coordinate space having the X axis, the Y axis, and the Z axis, the virtual 3D object VO, and the predetermined 3D range OA. In the example of FIG. 10, one hand of the target person is moved in an angle direction resulting in a line segment joining both hands of the target person that is different from an initial direction of a line segment joining both hands in a state in which both the hands are in a closed state within the predetermined 3D range OA. This operation of using the hands can be said to be a gesture of gripping an object with both the hands and pulling one part of the object in a certain direction while holding the other part. When this gesture is recognized, the display side device 20 rotates the virtual 3D object VO on the basis of a solid angle change amount between a straight line joining both the hands at the time at which each operation becomes valid and a straight line joining both the hands after the one hand is moved. At this time, the display side device 20 sets the hand initially forming a closed state as a rotation axis at the time at which each operation becomes valid.

When enlargement, reduction and rotation operations become valid, the display side device 20 determines enlargement and reduction, or rotation on the basis of a change in a vector (line segment) connecting both hands which are closed to each other. Specifically, the display side device 20 compares a unit vector obtained by normalizing a vector at the time at which both the hands are closed, that is, at which enlargement, reduction and rotation operations become valid, with a unit vector of a subsequent vector, and if the unit vectors are approximate to each other, an enlargement process or a reduction process corresponding to a change in a size of the vector is performed. On the other hand, if the unit vectors are not approximate to each other, the display side device 20 performs a rotation process.

As described above, the target person can rotate the virtual 3D object by making a gesture of gripping an object with both hands and pulling one part of the object in a certain direction while holding the other part. The gesture and the virtual 3D object operation are also similar to an operation on an object in the real world, and are thus intuitively related to each other.

Modification Examples

In the above-described first exemplary embodiment and second exemplary embodiment, as illustrated in FIG. 3, the HMD 9 has the visual line cameras 9a and 9b and the displays 9c and 9d corresponding to both eyes of the target person (user), but may have a single visual line camera and a single display. In this case, the single display may be disposed to cover a visual field of one eye of the target person, and may be disposed to cover visual fields of both eyes of the target person. In this case, the virtual data generation unit 24 of the display side device 20 may generate virtual 3D object data by using a well-known 3DCG technique so as to display a display object included in a virtual 3D space with 3DCG.

In addition, in the above-described first exemplary embodiment and second exemplary embodiment, the video see-through type HMD 9 is used to obtain visual line images, but an optical see-through type HMD 9 may be used. In this case, half mirror displays 9c and 9d may be provided in the HMD 9, and a virtual 3D object may be displayed on the displays 9c and 9d. However, in this case, a camera used to obtain an image for detecting a common real object in a visual line direction of a target person is provided at a location which does not shield a visual field of the target person of the HMD 9.

In addition, in the above-described first exemplary embodiment and second exemplary embodiment, as illustrated in FIG. 1, the sensor side device 10 and the display side device 20 are provided separately from each other, and the virtual 3D object is synthesized with the visual line images of the target person, but an image may be displayed in which the virtual 3D object is synthesized with the two-dimensional image included in the 3D information which is obtained by the sensor side device 10.

Figure 11:
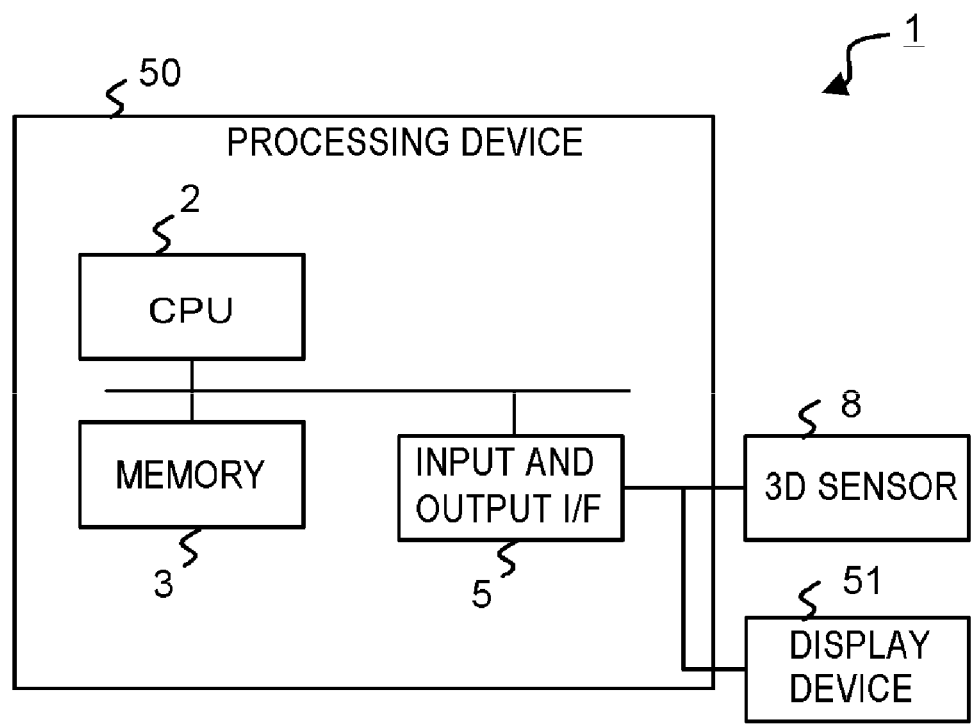
FIG. 11 is a diagram conceptually illustrating a hardware configuration example of a three-dimensional user interface apparatus (3D-UI apparatus) in a modification example.

FIG. 11 is a diagram conceptually illustrating a hardware configuration example of the 3D-UI apparatus 1 in a modification example. The 3D-UI apparatus 1 includes a processing device 50, a 3D sensor 8, and a display device 51. The processing device 50 includes a CPU 2, a memory 3, an input and output I/F 5, and the like, and the input and output I/F 5 is connected to the 3D sensor 8 and the display device 51. The display device 51 displays a synthesized image.

Figure 12:
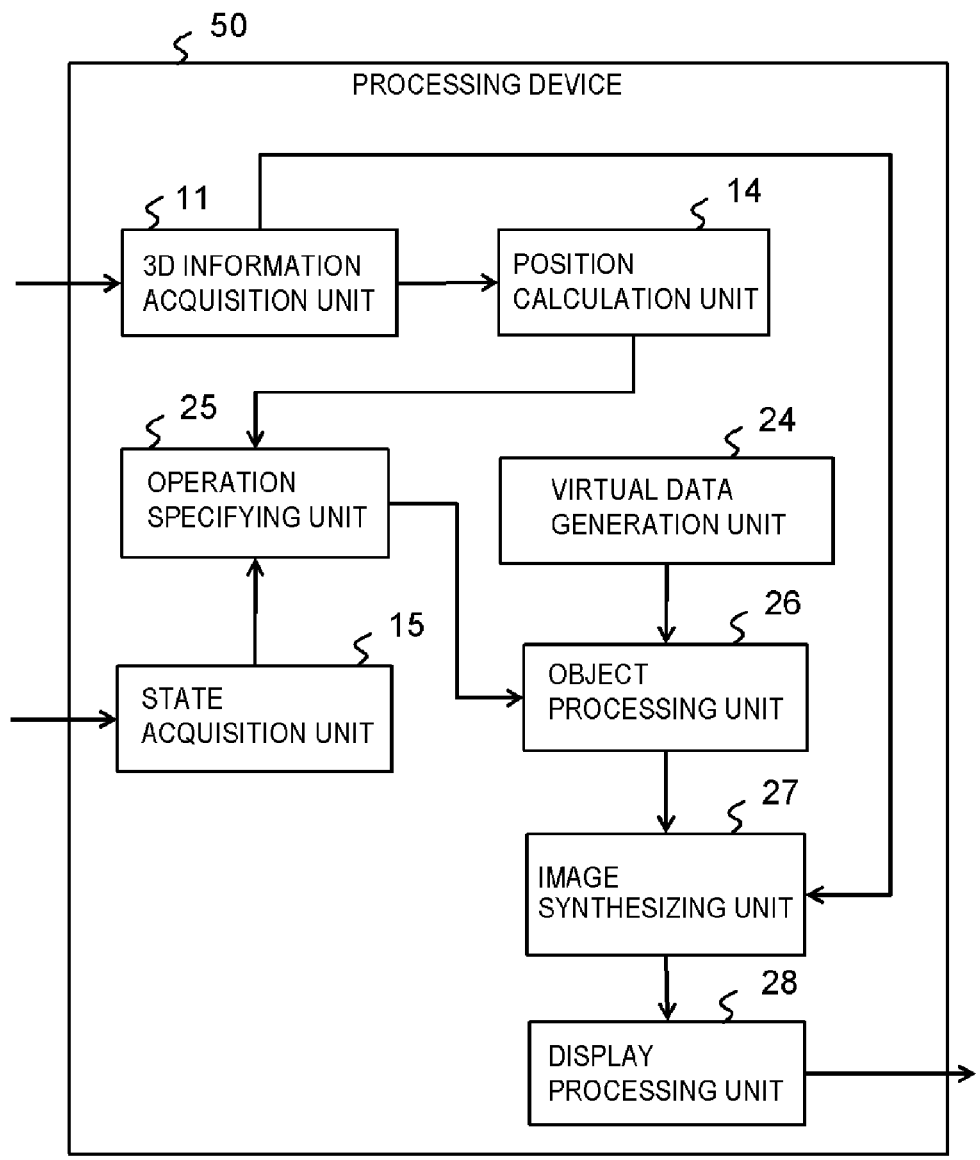
FIG. 12 is a diagram conceptually illustrating a process configuration example of the three-dimensional user interface apparatus (3D-UI apparatus) in the modification example.

FIG. 12 is a diagram conceptually illustrating a process configuration example of the 3D-UI apparatus 1 in a modification example. The 3D-UI apparatus 1 in the modification example includes the 3D information acquisition unit 11, the position calculation unit 14, and the state acquisition unit 15, included in the sensor side device 10 in the above-described respective exemplary embodiments, and the virtual data generation unit 24, the operation specifying unit 25, the object processing unit 26, the image synthesizing unit 27, and the display processing unit 28, included in the display side device 20 in the above-described respective exemplary embodiments. Each of the processing units is the same as that in the above-described respective exemplary embodiments except for the following content.

The position calculation unit 14 directly obtains the three-dimensional position information of the specific part of the target person from the three-dimensional information which is obtained from the 3D sensor 8 by the 3D information acquisition unit 11. The operation specifying unit 25 specifies the predetermined process on the basis of the three-dimensional position information of the camera coordinate system calculated by the position calculation unit 14 and the state information obtained by the state acquisition unit 15. The image synthesizing unit 27 synthesizes the two-dimensional image included in the three-dimensional information obtained by the 3D information acquisition unit 11 with virtual 3D object data which has undergone the predetermined process by the object processing unit 26.

In this modification example, the target person operates a virtual 3D object while taking a look at an image of the target person him/herself captured from directions other than a visual line direction thereof. Therefore, in this modification example, there is a possibility that intuition may be reduced compared with the above-described respective exemplary embodiments using visual line images of the target person him/herself, but an easily understandable operation can be sufficiently realized since a virtual 3D object can be operated through a 3D gesture using a specific part.

In the flowchart used for the above description, a plurality of steps (processes) are sequentially disclosed, but an execution order of steps executed in the present exemplary embodiment is not limited to the described order. In the present exemplary embodiment, an order of illustrated steps may be changed within a range of not causing trouble in content. Further, the above-described respective exemplary embodiments and modification examples may be combined with each other within a range of not causing conflict in content.

Some or all of the above-described respective exemplary embodiments and modification examples may be specified as in the following notes. However, the respective exemplary embodiments and modification examples are not limited to the following disclosure.

(Note 1)

A three-dimensional user interface apparatus including:

a three-dimensional information acquisition unit that acquires three-dimensional information from a three-dimensional sensor;

a position calculation unit that calculates three-dimensional position information on a three-dimensional coordinate space regarding a specific part of a target person by using the three-dimensional information acquired by the three-dimensional information acquisition unit;

a virtual data generation unit that generates virtual three-dimensional object data indicating a virtual three-dimensional object disposed in the three-dimensional coordinate space;

a state acquisition unit that acquires state information of the specific part of the target person;

an operation specifying unit that specifies a predetermined process to be performed from among a plurality of predetermined processes on the basis of a combination of the state information acquired by the state acquisition unit and a change in the three-dimensional position information;

an object processing unit that performs the predetermined process specified by the operation specifying unit on the virtual three-dimensional object data; and a display processing unit that displays a virtual three-dimensional object corresponding to the virtual three-dimensional object data on which the predetermined process has been performed, on a display unit.

(Note 2)

The three-dimensional user interface apparatus according to Note 1, in which the operation specifying unit determines whether or not the specific part of the target person is present within a predetermined three-dimensional range with reference to the virtual three-dimensional object on the basis of the three-dimensional position information calculated by the position calculation unit, and determines whether or not the predetermined process is to be performed by the object processing unit according to a result of the determination.

(Note 3)

The three-dimensional user interface apparatus according to Note 1 or 2, in which the position calculation unit calculates the three-dimensional position information of one hand of the target person as the specific part of the target person, in which the state acquisition unit acquires the state information of the one hand of the target person as the specific part of the target person, and in which the operation specifying unit specifies, as the predetermined process, a process of performing a movement by a distance corresponding to a linear movement amount of the one hand while the one hand of the target person is maintained in a specific state.

(Note 4)

The three-dimensional user interface apparatus according to Note 3, in which, in a case where a distance from a specific point of the virtual three-dimensional object to the one hand of the target person is not changed before and after the one hand is moved while the one hand is maintained in the specific state, the operation specifying unit specifies, as the predetermined process, a rotation process with the specific point of the virtual three-dimensional object as a reference point on the basis of a solid angle change amount of a line segment joining the one hand of the target person and the specific point of the virtual three-dimensional object.

(Note 5)

The three-dimensional user interface apparatus according to Note 2, in which the operation specifying unit detects a movement of the specific part of the target person from within the predetermined three-dimensional range to the outside of the predetermined three-dimensional range, and specifies, as the predetermined process, a movement process or a rotation process corresponding to a distance and a direction between a position within the predetermined three-dimensional range and a position outside the predetermined three-dimensional range before and after the movement.

(Note 6)

The three-dimensional user interface apparatus according to any one of Notes 1 to 5, in which the position calculation unit calculates respective pieces of three-dimensional position information on a three-dimensional coordinate space regarding a plurality of specific parts of the target person, in which the state acquisition unit acquires respective pieces of state information regarding the plurality of specific parts of the target person, and in which the operation specifying unit calculates a positional relationship between the plurality of specific parts on the basis of the plurality of pieces of three-dimensional position information regarding the plurality of specific parts calculated by the position calculation unit, and specifies the predetermined process from among the plurality of predetermined processes on the basis of a change in the calculated positional relationship and the plurality of pieces of state information acquired by the state acquisition unit.

(Note 7)

The three-dimensional user interface apparatus according to Note 6, in which the position calculation unit calculates three-dimensional position information of both hands of the target person as the plurality of specific parts, in which the state acquisition unit acquires state information of both the hands as the plurality of specific parts of the target person, and in which the operation specifying unit specifies, as the predetermined process, an enlargement process or a reduction process with a position of one hand of the target person as a reference point at a magnification ratio or a reduction ratio corresponding to a change amount of a distance between both the hands while both the hands are maintained in a specific state, or a rotation process with a position of one hand of the target person as a reference point on the basis of a solid angle change amount of a line segment joining both the hands while both the hands are maintained in a specific state.

(Note 8)

The three-dimensional user interface apparatus according to any one of Notes 1 to 7, in which, the operation specifying unit measures a period in which state information acquired by the state acquisition unit and the three-dimensional position information are not changed, and in a chase where the measured period exceeds a predetermined period, the operation specifying unit specifies, as the predetermined process, a process of adding display data of a function menu to data of a virtual three-dimensional space in which the virtual three-dimensional object is disposed.

(Note 9)

The three-dimensional user interface apparatus according to any one of Notes 1 to 8, further including:

a first object detection unit that detects a known common real object from the three-dimensional information;

a first reference setting unit that sets the three-dimensional coordinate space on the basis of the common real object detected by the first object detection unit and calculates a position and a direction of the three-dimensional sensor;

a visual line image acquisition unit that acquires a visual line image in which the specific part of the target person is reflected from an imaging unit that is disposed at a position and in a direction different from the position and direction of the three-dimensional sensor;

a second object detection unit that detects the known common real object from the visual line image acquired by the visual line image acquisition unit;

a second reference setting unit that shares the three-dimensional coordinate space on the basis of the common real object detected by the second object detection unit and calculates a position and a direction of the imaging unit; and an image synthesizing unit that synthesizes the virtual three-dimensional object and the visual line image captured by the imaging unit on the basis of the position and the direction of the imaging unit calculated by the second reference setting unit and the three-dimensional coordinate space, in which the position calculation unit calculates the three-dimensional position information on the three-dimensional coordinate space by converting three-dimensional position information regarding the specific part of the target person acquired from the three-dimensional information which is acquired by the three-dimensional information acquisition unit on the basis of the position and the direction of the three-dimensional sensor calculated by the first reference setting unit and the three-dimensional coordinate space, and in which the display processing unit displays the image obtained by the image synthesizing unit on the display unit.

(Note 10)

A three-dimensional operation method executed by at least one computer, including:

acquiring three-dimensional information from a three-dimensional sensor;

calculating three-dimensional position information on a three-dimensional coordinate space regarding a specific part of a target person by using the acquired three-dimensional information;

generating virtual three-dimensional object data indicating a virtual three-dimensional object disposed in the three-dimensional coordinate space;

acquiring state information of the specific part of the target person;

specifying a predetermined process to be performed from among a plurality of predetermined processes on the basis of a combination of the acquired state information and a change in the three-dimensional position information;

performing the specified predetermined process on the virtual three-dimensional object data; and displaying a virtual three-dimensional object corresponding to the virtual three-dimensional object data on which the predetermined process has been performed, on a display unit.

(Note 11)

The three-dimensional operation method according to Note 10, further including:

determining whether or not the specific part of the target person is present within a predetermined three-dimensional range with reference to the virtual three-dimensional object on the basis of the calculated three-dimensional position information; and determining whether or not the predetermined process is to be performed according to a result of the determination.

(Note 12)

The three-dimensional operation method according to Note 10 or 11, in which, the calculating of the three-dimensional position information includes calculating the three-dimensional position information of the one hand of the target person as the specific part of the target person, in which, the acquiring of the state information includes acquiring the state information of the one hand of the target person as the specific part of the target person, and in which, the specifying of the predetermined process includes specifying, as the predetermined process, a process of performing a movement by a distance corresponding to a linear movement amount of the one hand of the target person while the one hand is maintained in the specific state.

(Note 13)

The three-dimensional operation method according to Note 12, in which, the specifying of the predetermined process includes specifying, as the predetermined process, a rotation process with the specific point of the virtual three-dimensional object as a reference point on the basis of a solid angle change amount of a line segment joining the one hand of the target person and a specific point of the virtual three-dimensional object in a case where a distance from the specific point of the virtual three-dimensional object to the one hand of the target person is not changed before and after the one hand is moved while the one hand is maintained in the specific state.

(Note 14)

The three-dimensional operation method according to Note 11, in which, the specifying of the predetermined process includes detecting a movement of the specific part of the target person from within the predetermined three-dimensional range to the outside of the predetermined three-dimensional range and specifying, as the predetermined process, a movement process or a rotation process corresponding to a distance and a direction between a position within the predetermined three-dimensional range and a position outside the predetermined three-dimensional range before and after the movement.

(Note 15)

The three-dimensional operation method according to any one of Notes 10 to 14, in which, the calculating of the three-dimensional position information includes calculating respective pieces of three-dimensional position information on a three-dimensional coordinate space regarding a plurality of specific parts of the target person, in which, the acquiring of the state information includes acquiring respective pieces of state information regarding the plurality of specific parts of the target person, and in which, the specifying of the predetermined process includes calculating a positional relationship between the plurality of specific parts on the basis of the plurality of pieces of calculated three-dimensional position information regarding the plurality of specific parts, and specifying the predetermined process from among the plurality of predetermined processes on the basis of a change in the calculated positional relationship and the plurality of pieces of acquired state information.

(Note 16)

The three-dimensional operation method according to Note 15, in which, the calculating of the three-dimensional position information includes calculating the three-dimensional position information of both hands of the target person as the plurality of specific parts, in which the acquiring of the state information includes acquiring the respective pieces of state information of both the hands of the target person as the plurality of specific parts, and in which the specifying of the predetermined process includes specifying, as the predetermined process, an enlargement process or a reduction process with a position of one hand of the target person as a reference point at a magnification ratio or a reduction ratio corresponding to a change amount of a distance between both the hands while both the hands are maintained in the specific state, or a rotation process with a position of one hand of the target person as a reference point on the basis of a solid angle change amount of a line segment joining both the hands while both the hands are maintained in the specific state.

(Note 17)

The three-dimensional operation method according to any one of Notes 10 to 16, in which, the specifying of the predetermined process includes measuring a period in which the acquired state information and the three-dimensional position information are not changed, and specifying, as the predetermined process, a process of adding display data of a function menu to data of a virtual three-dimensional space in which the virtual three-dimensional object is disposed in a case where the measured period exceeds a predetermined period.

(Note 18)

The three-dimensional operation method according to any one of Notes 10 to 17, further including:

detecting a known common real object from the three-dimensional information;

setting the three-dimensional coordinate space on the basis of the detected common real object and calculating a position and a direction of the three-dimensional sensor;

acquiring a visual line image in which the specific part of the target person is reflected from an imaging unit that is disposed at a position and in a direction different from the position and direction of the three-dimensional sensor;

detecting the known common real object from the obtained visual line image;

sharing the three-dimensional coordinate space on the basis of the detected common real object and calculating a position and a direction of the imaging unit; and synthesizing the virtual three-dimensional object with the visual line image captured by the imaging unit on the basis of the position and the direction of imaging unit and the three-dimensional coordinate space, in which, the calculating of the three-dimensional position information includes converting three-dimensional position information regarding the specific part of the target person acquired from the acquired three-dimensional information on the basis of the calculated position and direction of the three-dimensional sensor and the three-dimensional coordinate space to calculate the three-dimensional position information on the three-dimensional coordinate space, and in which, the displaying of the virtual three-dimensional object includes displaying the obtained image on the display unit.

(Note 19)

A program causing at least one computer to execute the three-dimensional operation method according to any one of Notes 10 to 18.

(Note 20)

A computer readable recording medium recording the program according to Note 19 thereon.

This application claims the benefit of Japanese Priority Patent Application JP 2012-167040 filed Jul. 27, 2012, the entire contents of which are incorporated herein by reference.

What is claimed is:

1. A three-dimensional user interface apparatus comprising:

a three-dimensional information acquisition unit that acquires three-dimensional information from a three-dimensional sensor;

a position calculation unit that calculates three-dimensional position information on a three-dimensional coordinate space regarding a specific part of a target person by using the three-dimensional information acquired by the three-dimensional information acquisition unit;

a virtual data generation unit that generates virtual three-dimensional object data indicating a virtual three-dimensional object disposed in the three-dimensional coordinate space;

a state acquisition unit that acquires state information of the specific part of the target person;

an operation specifying unit that specifies a predetermined process to be performed from among a plurality of predetermined processes on the basis of a combination of the state information acquired by the state acquisition unit and a change in the three-dimensional position information;

an object processing unit that performs the predetermined process specified by the operation specifying unit on the virtual three-dimensional object data; and a display processing unit that displays a virtual three-dimensional object corresponding to the virtual three-dimensional object data on which the predetermined process has been performed, on a display unit, wherein the operation specifying unit determines whether the specific part of the target person is present within a predetermined three-dimensional range with reference to the virtual three-dimensional object on the basis of the three-dimensional position information calculated by the position calculation unit, and determines whether the predetermined process is to be performed by the object processing unit according to a result of the determination, wherein the operation specifying unit detects a movement of the specific part of the target person from within the predetermined three-dimensional range to the outside of the predetermined three-dimensional range, and specifies, as the predetermined process, a movement process or a rotation process corresponding to a distance and a direction between a position within the predetermined three-dimensional range and a position outside the predetermined three-dimensional range before and after the movement.

2. The three-dimensional user interface apparatus according to claim 1, wherein the position calculation unit calculates the three-dimensional position information of one hand of the target person as the specific part of the target person, wherein the state acquisition unit acquires the state information of the one hand of the target person as the specific part of the target person, and wherein the operation specifying unit specifies, as the predetermined process, a process of performing a movement by a distance corresponding to a linear movement amount of the one hand while the one hand of the target person is maintained in the specific state.

3. The three-dimensional user interface apparatus according to claim 2, wherein, in a case where a distance from a specific point of the virtual three-dimensional object to the one hand of the target person is not changed before and after the one hand is moved while the one hand is maintained in the specific state, the operation specifying unit specifies, as the predetermined process, a rotation process with the specific point of the virtual three-dimensional object as a reference point on the basis of a solid angle change amount of a line segment joining the one hand of the target person and the specific point of the virtual three-dimensional object.

4. The three-dimensional user interface apparatus according to claim 1, wherein the position calculation unit calculates respective pieces of three-dimensional position information on a three-dimensional coordinate space regarding a plurality of specific parts of the target person, wherein the state acquisition unit acquires respective pieces of state information regarding the plurality of specific parts of the target person, and wherein the operation specifying unit calculates a positional relationship between the plurality of specific parts on the basis of the plurality of pieces of three-dimensional position information regarding the plurality of specific parts calculated by the position calculation unit, and specifies the predetermined process from among the plurality of predetermined processes on the basis of a change in the calculated positional relationship and the plurality of pieces of state information acquired by the state acquisition unit.

5. The three-dimensional user interface apparatus according to claim 4, wherein the position calculation unit calculates three-dimensional position information of both hands of the target person as the plurality of specific parts, wherein the state acquisition unit acquires state information of both the hands of the target person as the plurality of specific parts, and wherein the operation specifying unit specifies, as the predetermined process, an enlargement process or a reduction process with a position of one hand of the target person as a reference point at a magnification ratio or a reduction ratio corresponding to a change amount of a distance between both the hands while both the hands are maintained in a specific state, or a rotation process with a position of one hand of the target person as a reference point on the basis of a solid angle change amount of a line segment joining both the hands while both the hands are maintained in a specific state.

6. The three-dimensional user interface apparatus according to claim 1, wherein the operation specifying unit measures a period in which state information acquired by the state acquisition unit and the three-dimensional position information are not changed, and in a case where the measured period exceeds a predetermined period, the operation specifying unit specifies, as the predetermined process, a process of adding display data of a function menu to data of a virtual three-dimensional space in which the virtual three-dimensional object is disposed.

7. The three-dimensional user interface apparatus according to claim 1, further comprising:

a first object detection unit that detects a known common real object from the three-dimensional information;

a first reference setting unit that sets the three-dimensional coordinate space on the basis of the common real object detected by the first object detection unit and calculates a position and a direction of the three-dimensional sensor;

a visual line image acquisition unit that acquires a visual line image in which the specific part of the target person is reflected from an imaging unit that is disposed at a position and in a direction different from the position and direction of the three-dimensional sensor;

a second object detection unit that detects the known common real object from the visual line image acquired by the visual line image acquisition unit;

a second reference setting unit that shares the three-dimensional coordinate space on the basis of the common real object detected by the second object detection unit and calculates a position and a direction of the imaging unit; and an image synthesizing unit that synthesizes the virtual three-dimensional object and the visual line image captured by the imaging unit on the basis of the position and the direction of the imaging unit calculated by the second reference setting unit and the three-dimensional coordinate space, wherein the position calculation unit calculates the three-dimensional position information on the three-dimensional coordinate space by converting three-dimensional position information regarding the specific part of the target person acquired from the three-dimensional information which is acquired by the three-dimensional information acquisition unit on the basis of the position and the direction of the three-dimensional sensor calculated by the first reference setting unit and the three-dimensional coordinate space, and wherein the display processing unit displays the image obtained by the image synthesizing unit on the display unit.

8. A three-dimensional operation method executed by at least one computer, comprising:

acquiring three-dimensional information from a three-dimensional sensor;

calculating three-dimensional position information on a three-dimensional coordinate space regarding a specific part of a target person by using the acquired three-dimensional information;

generating virtual three-dimensional object data indicating a virtual three-dimensional object disposed in the three-dimensional coordinate space;

acquiring state information of the specific part of the target person;

specifying a predetermined process to be performed from among a plurality of predetermined processes on the basis of a combination of the acquired state information and a change in the three-dimensional position information;

performing the specified predetermined process on the virtual three-dimensional object data; and displaying a virtual three-dimensional object corresponding to the virtual three-dimensional object data on which the predetermined process has been performed, on a display unit, wherein specifying the predetermined process comprises determining whether the specific part of the target person is present within a predetermined three-dimensional range with reference to the virtual three-dimensional object on the basis of the calculated three-dimensional position information, and determining whether the predetermined process is to be performed according to a result of the determination, wherein specifying the predetermined process comprises detecting a movement of the specific part of the target person from within the predetermined three-dimensional range to the outside of the predetermined three-dimensional range, and specifying, as the predetermined process, a movement process or a rotation process corresponding to a distance and a direction between a position within the predetermined three-dimensional range and a position outside the predetermined three-dimensional range before and after the movement.

9. The three-dimensional operation method according to claim 8, further comprising:

determining whether or not the specific part of the target person is present within a predetermined three-dimensional range with reference to the virtual three-dimensional object on the basis of the calculated three-dimensional position information; and determining whether or not the predetermined process is to be performed according to a result of the determination.

10. The three-dimensional operation method according to claim 8, wherein the calculating of the three-dimensional position information includes calculating respective pieces of three-dimensional position information on a three-dimensional coordinate space regarding a plurality of specific parts of the target person, wherein the acquiring of the state information includes acquiring respective pieces of state information regarding the plurality of specific parts of the target person, and wherein the specifying of the predetermined process includes calculating a positional relationship between the plurality of specific parts on the basis of the plurality of pieces of calculated three-dimensional position information regarding the plurality of specific parts, and specifying the predetermined process from among the plurality of predetermined processes on the basis of a change in the calculated positional relationship and the plurality of pieces of acquired state information.

11. A non-transitory computer-readable storage medium storing a program for causing at least one computer to execute a three-dimensional operation method, the three-dimensional operation method comprising:

acquiring three-dimensional information from a three-dimensional sensor;

calculating three-dimensional position information on a three-dimensional coordinate space regarding a specific part of a target person by using the acquired three-dimensional information;

generating virtual three-dimensional object data indicating a virtual three-dimensional object disposed in the three-dimensional coordinate space;

acquiring state information of the specific part of the target person;

specifying a predetermined process to be performed from among a plurality of predetermined processes on the basis of a combination of the acquired state information and a change in the three-dimensional position information;

performing the specified predetermined process on the virtual three-dimensional object data; and displaying a virtual three-dimensional object corresponding to the virtual three-dimensional object data on which the predetermined process has been performed, on a display unit, wherein specifying the predetermined process comprises determining whether the specific part of the target person is present within a predetermined three-dimensional range with reference to the virtual three-dimensional object on the basis of the calculated three-dimensional position information, and determining whether the predetermined process is to be performed according to a result of the determination, wherein specifying the predetermined process comprises detecting a movement of the specific part of the target person from within the predetermined three-dimensional range to the outside of the predetermined three-dimensional range, and specifying, as the predetermined process, a movement process or a rotation process corresponding to a distance and a direction between a position within the predetermined three-dimensional range and a position outside the predetermined three-dimensional range before and after the movement.

12. The non-transitory computer-readable storage medium according to claim 11, wherein the three-dimensional operation method further includes:

determining whether or not the specific part of the target person is present within a predetermined three-dimensional range with reference to the virtual three-dimensional object on the basis of the calculated three-dimensional position information; and determining whether or not the predetermined process is to be performed according to a result of the determination.

13. The non-transitory computer-readable storage medium according to claim 11, wherein the calculating of the three-dimensional position information includes calculating respective pieces of three-dimensional position information on a three-dimensional coordinate space regarding a plurality of specific parts of the target person, wherein the acquiring of the state information includes acquiring respective pieces of state information regarding the plurality of specific parts of the target person, and wherein the specifying of the predetermined process includes calculating a positional relationship between the plurality of specific parts on the basis of the plurality of pieces of calculated three-dimensional position information regarding the plurality of specific parts, and specifying the predetermined process from among the plurality of predetermined processes on the basis of a change in the calculated positional relationship and the plurality of pieces of acquired state information.

14. A three-dimensional user interface apparatus comprising:

a three-dimensional information acquisition unit that acquires three-dimensional information from a three-dimensional sensor;

a position calculation unit that calculates three-dimensional position information on a three-dimensional coordinate space regarding a specific part of a target person by using the three-dimensional information acquired by the three-dimensional information acquisition unit;

a virtual data generation unit that generates virtual three-dimensional object data indicating a virtual three-dimensional object disposed in the three-dimensional coordinate space;

a state acquisition unit that acquires state information of the specific part of the target person;

an operation specifying unit that specifies a predetermined process to be performed from among a plurality of predetermined processes on the basis of a combination of the state information acquired by the state acquisition unit and a change in the three-dimensional position information;

an object processing unit that performs the predetermined process specified by the operation specifying unit on the virtual three-dimensional object data; and a display processing Unit that displays a virtual three-dimensional object corresponding to the virtual three-dimensional object data on which the predetermined process has been performed, on a display unit, wherein the operation specifying, unit measures a period in which state information acquired by the state acquisition unit and the three-dimensional position information are not changed, and in a case where the measured period exceeds a predetermined period, the operation specifying unit specifies, as the predetermined process, a process of adding display data of a function menu to data of a virtual three-dimensional space in which the virtual three-dimensional object is disposed.

* * * * *